May 8, 1923.
J. G. CALLO
1,454,466
VEHICLE WHEEL
Filed Oct. 18, 1922
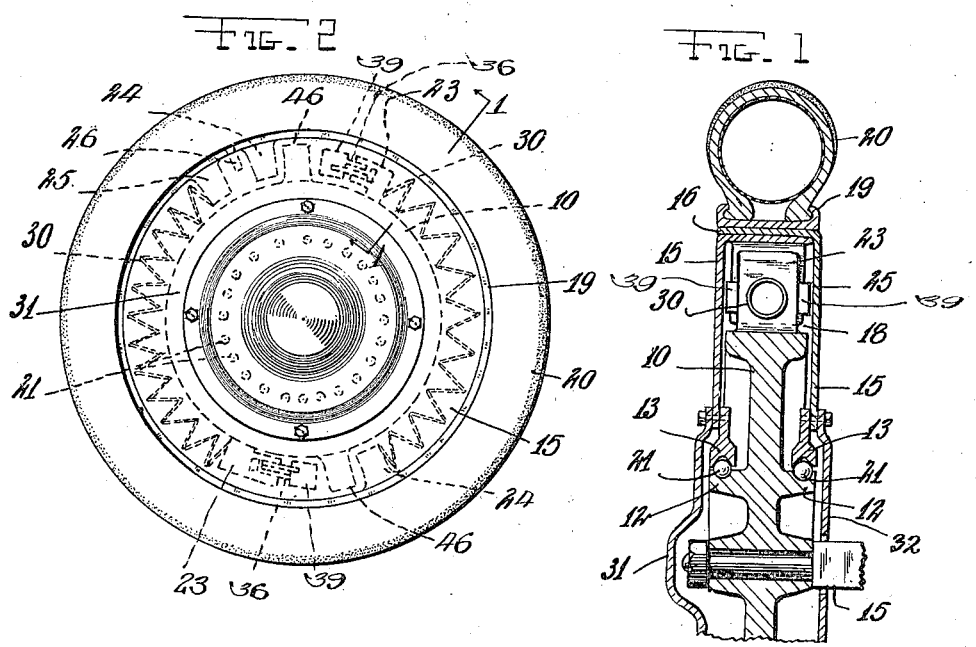
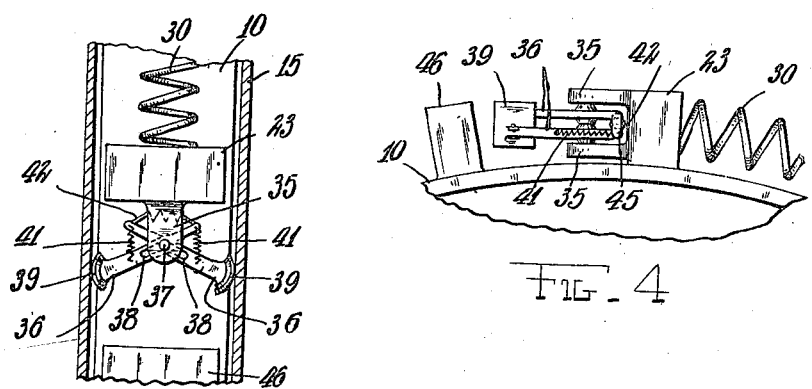
Inventor
Joseph G. Callo
By Joltan H. Polachek
Attorney Patented May 8, 1923.

1,454,466

UNITED STATES PATENT OFFICE.

JOSEPH G. CALLO, OF NEW YORK, N. Y.

VEHICLE WHEEL.

Application filed October 18, 1922. Serial No. 595,240.

*To all whom it may concern:*

Be it known that I, JOSEPH G. CALLO, a citizen of the United States, residing at New York, in the county of New York and State of New York, have invented certain new and useful Improvements in Vehicle Wheels, of which the following is a specification.

This invention relates generally to vehicle wheels, being intended more particularly for application to automobiles, motor trucks and the like.

The invention has for an object to provide a novel wheel by the use of which the jerks incident to starting and stopping or change of gear of the vehicle will be eliminated.

For further comprehension of the invention, and of the objects and advantages thereof, reference will be had to the following description and accompanying drawings, and to the appended claims in which the various novel features of the invention are more particularly set forth.

Fig. 1 of the drawings is a partial axial sectional view showing an automobile wheel constructed according to my invention, this view being taken along the line 1—1 of Fig. 2.

Fig. 2 is a face view thereof.

Fig. 3 is a fragmentary horizontal section, taken just inside the rim of the wheel and showing the braking device.

Fig. 4 is a side elevation of the braking means shown in Fig. 3.

Referring now to the drawing my improved wheel as here shown comprises a central disk 10 fixed on an axle 11 of ordinary construction. Formed on opposite sides of the disk 10, approximately midway between its centre and circumference are outwardly facing ball races 12 co-operating with inwardly facing ball races 13 on the inner edges of a pair of flat rings 15 which extend outwardly across and beyond the sides of the disk 10 and have overlapping angular flanges 16 at their outer edges whereby they are united into a single solid structure of U-shape in cross section, and leaving an annular chamber 18 between said flanges and the face of the disk 10. Fixed to the outer one of these flanges 16 is a metal rim 19 on which the tire 20 is mounted. The balls running in the races 12, 13 are indicated at 21.

Fixed to the disk 10, and projecting into the annular chamber 18, are a pair of substantially diametrically opposed lugs 23, while a second pair of diametrically opposed lugs 24 project inwardly from the flange into the chamber. Spaced a short distance apart circumferentially from one of the lugs 24 is a third lug 25, the tire valve 26 being received therebetween and the said lug 24. Fixed to the disk 10 and spaced a short distance circumferentially from the lugs 23 are other lugs 46, the braking devices to be presently described being located in the spaces between the lugs 23 and 46. Located in the chamber 18, and bearing between the respective lugs 23 on the disk 10 and those on the outer structure 15, 16 are coiled compression springs 30 which act as a cushion between the disk 10, constituting the driving element, and the said outer structure, constituting the driven element. Covering plates 31, 32 may extend across the central portion of the wheel, these springs normally act to press the lugs 46 against the lugs 24.

When the vehicle is started, or increased in speed, these springs 30 tend to compress and thus eliminate the jerks which would otherwise follow, resulting in smoother riding, more especially in cities where heavy traffic compels frequent stopping or change of speed.

In Figs. 3 and 4 I have shown in detail the means which are provided to retard the movement of the driven element under the expansion of the springs 30 when power is removed from the driving element. In this construction the disk 10 has formed thereon lugs such as 23′ corresponding in position to the lugs 23. Each lug 23′ has projecting rearwardly therefrom a pair of ears 35 between which is positioned a pair of crossed levers 36 fulcrumed between their ends on a pin 37 fixed in the said ears and passing through short longitudinal slots 38 in the levers.

These levers 36 are normally obliquely inclined as shown and have friction shoes 39 on their rear ends adapted to bear on the inner faces of the rings 15. Connecting the forward arm of each lever with the rear arm of the other lever are weak coiled tension springs 41 which act to keep the shoes 39 engaged with the rings 15. Connecting together the forward ends of the levers is a heavy coiled tension spring 42 arranged so that normally it is not under tension.

When the main springs 30 start to expand the two levers 36 tend to straighten out upon one another, the slots 38 allowing such movement. As the levers straighten out the spring 42 is put under tension and acts to press the shoes 39 against the rings 15. To prevent the levers swinging too far their forward ends are respectively upwardly and downwardly turned as at 45.

With the above construction the relative movement of the driving and driven members under the expansion of the springs 30 will be retarded somewhat.

Having thus described my invention what I claim as new and desire to protect by Letters Patent of the United States is as follows:

1. In a vehicle wheel, an inner driving element, an outer driving element in the form of an annulus of U-shape in cross section partially enclosing said inner element, lugs projecting respectively inwardly and outwardly from said outer and inner elements, coiled compression springs located between the respective lugs, and automatic frictional braking devices carried by the inner element and adapted to engage the sides of said outer element to retard movement of the said elements upon one another.

2. In a vehicle wheel, an inner driving element, an outer driven element, and a compression spring interposed between said elements, and an automatically acting frictional braking device for retarding movement of said elements upon one another under the expansive influence of said spring.

3. In a vehicle wheel, an inner driving element, an outer driven element, and a compression spring interposed between said elements, and frictional means for retarding movement of said elements upon one another under the expansive influence of said other spring, said means comprising a pair of crossed levers, weak springs normally pressing said levers each at one end against said driven element, and a heavy tension spring connected to the other ends of said levers, said last spring being normally inactive and acting upon said levers to press the same against said driven element when the first mentioned spring expands.

4. In a vehicle wheel, an inner driving element comprising a disk, an outer driven element in the form of an annulus of U-shape in cross section partially enclosing said disk, lugs projecting respectively inwardly and outwardly from said disk and annulus, and coiled expansion springs located between the respective lugs, a pair of crossed levers fulcrumed to the lug on the said disk and slotted to permit of longitudinal movement, said levers having friction shoes on one end adapted to engage the said annulus, weak springs acting to straighten said levers upon one another to cause said shoes to press on said annulus, and a heavy normally inactive spring acting on said levers, when the said annulus moves upon the said disk under the influence of the first mentioned spring, to move said levers longitudinally to press said shoes against said annulus.

In testimony whereof I have affixed my signature.

JOSEPH G. CALLO.